United States Patent Office

3,076,012
PHOSPHORIC ACID ESTERS AND PROCESSES FOR THEIR PRODUCTION
Hans-Gerd Schicke, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany
No Drawing. Filed Nov. 3, 1961, Ser. No. 149,855
Claims priority, application Germany Nov. 5, 1960
9 Claims. (Cl. 260—461)

The present invention relates to and has as its objects new and useful insecticidal active phosphoric acid esters and processes for their production. Generally the new compounds of this invention may be represented by the following formula

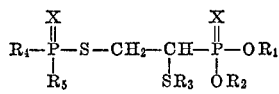

In this formula, X stands for a chalcogen having an atomic number from 8 to 16; $R_1$ and $R_2$ stand for hydrocarbon residues, preferably with 1–6 carbon atoms; $R_3$ stands for a possibly substituted aliphatic, araliphatic, hydroaromatic or aromatic hydrocarbon residue; $R_4$ and $R_5$ can be aliphatic, araliphatic, cycloaliphatic or aromatic residues, which are attached to the phosphorus directly or via oxygen, sulfur or nitrogen. Vinyl phosphonic acid esters are already known from the literature and they are easily obtainable intermediate products of the chemical industry.

In accordance with the present invention it has been found that vinyl phosphonic acid esters react very easily with alkyl or aryl sulphenic acid chlorides and there result compounds of the following formula:

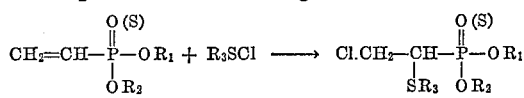

In these compounds the chlorine atom can easily be exchanged for the radicals of thiol-or thionothial-phosphoric (phosphonic, phosphinic) acid esters. In this way, compounds are obtained of the general formula shown above. For the carrying out of the reaction according to the invention, it is not necessary to start from pure sulfenic acid chlorides. The corresponding dialkyl or diaryl sulphides can be directly converted into the sulphenic acid chlorides by known methods, e.g. by reacting them with about the calculated amount of chlorine or by the addition of about the calculated amount of sulphuryl chloride. It is thereby advantageous to work in an inert solvent, for example carbon tetrachloride. This solution of the suplhenic acid chloride then can be used directly, without further purification, for the reaction with a vinyl phosphonic acid ester.

The reaction proceeds even at temperatures of 0–20° C. The addition products of the alkyl or aryl sulphenic acid chlorides to vinyl phosphonic acid esters can mostly be purified by distillation. In general, however, the crude products can also be used for the further working up, i.e. are further reacted with a suitable thionothiol- or thiolphosphoric (phosphonic, phosphinic) acid derivative.

The above-described reaction sequence is capable of wide variation. A large number of hitherto not described phosphoric acid esters can be produced from the addition products of sulphenic acid chlorides to vinyl phosphonic acid esters by exchange with suitable salts of the thionothiol- or thiolphosphoric (phosphonic, phosphinic) acids.

The new compounds of the present invention very effectively kill insects like flies, mites, aphids, etc. They distinguish themselves especially by a good contact-insecticidal activity and at the same time by an activity on eating insects such as caterpillars. The compounds may be used in the same manner as other known phosphoric acid insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula

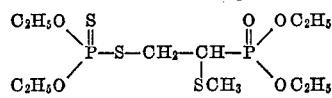

has been tested against flies and spider mites. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) against flies *Musca domestica*. About 50 flies are placed under covered Petri dishes in which drip wet filter paper has been placed which is sprayed with an insecticidal solution of a concentration as shown below and prepared as stated above. The living status of the flies has been determined after 24 hours. The following result has been obtained: flies were killed completely with 0.1% solutions.

(b) against spider mites (contact-insecticidal action): bean plants (*Phaseolus vulgaris*) of about 15 inches height were sprayed drip wet with solutions as prepared above in a concentration as shown below. The bean plants have been infested heavily with the two-spotted spider (species *Tetranychus telarius*). Evaluation of the plants has been carried out after 24 hours, 48 hours and 8 days. The following result has been obtained: spider mites are killed completely with 0.1% solutions.

The following examples are given for the purpose of illustrating the invention:

*Example 1*

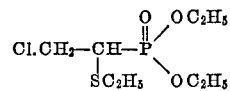

61 g. (0.5 mol) of diethyl disulphide are dissolved in 150 cc. of carbon tetrachloride. 68 g. of sulphuryl chloride are added dropwise at —5° C. followed by stirring for 30 minutes. The resultant solution of ethyl sulphenyl chloride (1 mol) is added dropwise at 0° C. to 164 g. (1 mol) of vinyl phosphonic acid-O,O-diethyl ester which are dissolved in 200 cc. of carbon tetrachloride. The reaction mixture is then stirred overnight at 20° C. The solvent is removed in a vacuum and the residue fractionated. Yield 253 g.=78% of the theoretical. B.P. 124–126° C./3–4 mm. Hg. Mean toxicity on rats per os 1000 mg./kg. Flies are killed with 0.1% solutions.

By the same way there may be obtained the compound of the following formula:

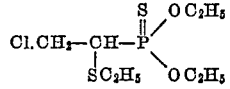

Example 2

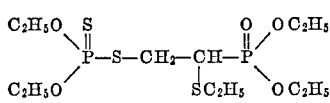

To a solution of 23 g. (0.1 mol) of the ammonium salt of diethyl dithiophosphoric acid in 100 cc. of acetonitrile there are added dropwise at 70° C. 26 g. of α-ethyl mercapto-β-chloroethyl phosphonic acid-O,O-diethyl ester. The reaction mixture is then heated to boiling for 2 hours and, after cooling, poured into 600 cc. of water. The oil which separates out is taken up with methylene chloride, washed with water and dried. After removal of the solvent, 26 g. of a viscous oil are obtained. Yield 63% of the theoretical. Mean toxicity on rats per os 500 mg./kg. Flies, plant lice and spider mites are killed 100% with 0.1% solutions. In the case of 0.1% solutions, the ester shows a 100% systemic action.

By the same way there may be obtained the compounds of the following formulae:

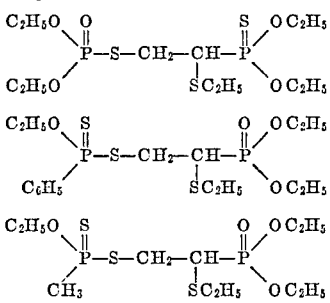

Example 3

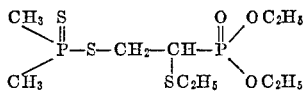

To a solution of 25 g. (0.15 mol) of dimethyl dithiophosphinic acid potassium in 100 cc. of acetonitrile there are added dropwise at 70° C. 39 g. (0.15 mol) of α-ethylmercapto-β-chloroethyl phosphonic acid-O,O-diethyl ester and stirred for 2 hours at 70–80° C. After cooling, the content of the flask is then poured into 600 cc. of water and worked up as described in the previous example. There is thus obtained 39 g.=74% of the theoretical of the new ester. Mean toxicity on rats per os 250 mg./kg. Flies are killed 100% with 0.1% solutions. The ester shows a 100% systemic action with 0.1% solutions.

By the same way there may be obtained the compounds of the following formulae:

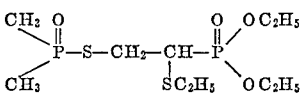

Example 4

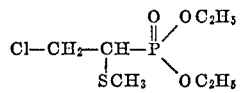

47 g. (0.5 mol) of dimethyl disulphide are dissolved in 150 cc. of carbon tetrachloride. 68 g. of sulphuryl chloride are added dropwise at −5° C. and then stirred for 30 minutes. The solution of the resultant methyl sulphenyl chloride (1 mol) is now added dropwise at 0° C. to a solution of 164 g. (1 mol) of vinyl phosphonic acid-O,O-diethyl ester in 200 cc. of carbon tetrachloride. The reaction mixture is stirred overnight, the solvent removed in a vacuum and the residue fractionated. B.P. 115–120° C./3 mm. Hg. Yield 177 g.=72% of the theoretical. Flies are killed 100% with 0.1% solutions. Mean toxicity on rats per os 500 mg./kg.

Example 5

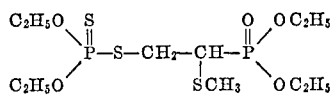

Into a solution of 21 g. (0.1 mol) of the ammonium salt of diethyl dithiophosphoric acid in 100 cc. of acetonitrile there are added dropwise at 70° C. 24.6 g. (0.1 mol) of α-methylmercapto-β-chloroethyl phosphonic acid-O,O-diethyl ester. The mixture is stirred for 2 hours at 70–80° C. on the contents of the flask then poured into water. The oil which separates out is taken up with methylene chloride, washed with water and dried. After removal of the solvent, 29 g. of a viscous oil are obtained. Yield 72% of the theoretical. Mean toxicity on rats per os 500 mg./kg. Flies are killed 100% with 0.01% solutions. Spider mites are killed 100% with 0.1% solutions.

By the same way there may be obtained the compounds of the following formulae:

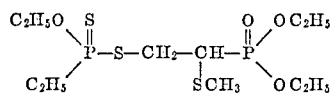

Example 6

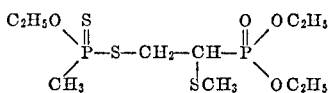

To a solution of 20 g. (0.1 mol) of the potassium salt of methyl thionophosphonic-O-ethyl ester-thiol acid in 100 cc. of acetonitrile there are added dropwise at 70° C. 24.6 g. (0.1 mol) of α-methylmercapto-β-chloroethyl phosphonic acid-O,O-diethyl ester, the mixture stirred for 2 hours at 70–80° C. and then worked up as described above. Yield 28 g.=76.5% of the theoretical. Mean toxicity on rats per os 10 mg./kg. Plant lice are killed 100% with 0.1% solutions. Spider mites are killed 95% with 0.01% solutions. In the case of 0.1% solutions the preparation shows a 100% action against eating insects, e.g. caterpillers. In the case of 0.1% solutions, the esters also shows a 100% systemic action.

Example 7

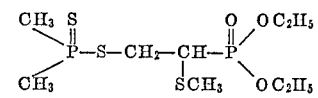

To a solution of 16.4 g. (0.1 mol) of the potassium salt of dimethyl dithiophosphinic acid in 100 cc. of acetonitrile there are added dropwise at 70° C. 24.6 g. (0.1 mol) of α-methylmercapto-β-chloroethyl phosphonic acid-O,O-diethyl ester. The mixture is stirred for 2 hours at 70–80° C. and then worked up as described previously. Yield 23 g.=70% of the theoretical. Mean toxicity on rats per os 100 mg./kg. In the case of 0.1% solutions, the ester shows a 100% systemic action.

We claim:

1. A compound of the following general formula

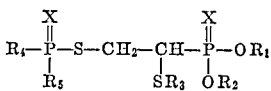

wherein X is a chalcogen having an atomic number from 8 to 16; $R_1$, $R_2$ and $R_3$ stand for lower alkyl groups up to 6 carbon atoms, $R_4$ and $R_5$ stand for members selected from the group consisting of lower alkyl groups, lower alkoxy groups, alkyl being a hydrocarbon radical up to 6 C-atoms and a phenyl group.

2. The compound of the following formula

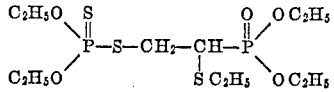

3. The compound of the following formula

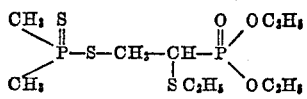

4. The compound of the following formula

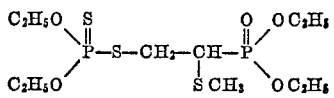

5. The compound of the following formula

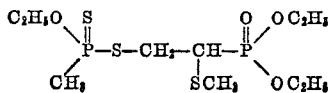

6. The compound of the following formula

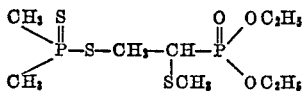

7. A compound of claim 1 wherein $R_4$ and $R_5$ are each alkoxy having up to 6 carbon atoms.

8. A compound of claim 1 wherein $R_4$ and $R_5$ are each alkyl having up to 6 carbon atoms.

9. A compound of claim 1 wherein $R_4$ is alkoxy having up to 6 carbon atoms and $R_5$ is alkyl having up to 6 carbon atoms.

References Cited in the file of this patent

UNITED STATES PATENTS 3,014,956    Birum _____ Dec. 26, 1961